(12) United States Patent
Moskovitz et al.

(10) Patent No.: US 9,152,668 B1
(45) Date of Patent: Oct. 6, 2015

(54) ASYNCHRONOUS COMPUTATION BATCHING

(75) Inventors: Dustin Moskovitz, San Francisco, CA (US); Justin Rosenstein, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 1294 days.

(21) Appl. No.: 12/697,172

(22) Filed: Jan. 29, 2010

(51) Int. Cl.
*G06F 17/30* (2006.01)

(52) U.S. Cl.
CPC ................... *G06F 17/30442* (2013.01)

(58) Field of Classification Search
CPC ......... G06F 9/4436; G06F 8/76; G06F 8/456; G06F 17/30938; G06F 17/30442
USPC ......... 717/100, 101, 102, 104, 114, 132, 183, 717/155, 156; 707/607, 643, 703, 713
See application file for complete search history.

(56) References Cited

U.S. PATENT DOCUMENTS

| | | | |
|---|---|---|---|
| 2004/0088318 A1* | 5/2004 | Brady | 707/102 |
| 2006/0101237 A1* | 5/2006 | Mohl et al. | 712/201 |
| 2008/0183667 A1* | 7/2008 | Li et al. | 707/2 |
| 2010/0199257 A1* | 8/2010 | Biggerstaff | 717/104 |

* cited by examiner

*Primary Examiner* — MD. I Uddin
(74) *Attorney, Agent, or Firm* — Schwegman Lundberg & Woessner, P.A.

(57) ABSTRACT

A method and a system implementing asynchronous computation batching. A web application written in a side-effect free manner possesses the quality of referential transparency. This property allows independent functions to be executed in any order or in parallel and enables necessary data for such functions to be gathered in a batch query. This property also extends to dependent functions and allows web applications to be written assuming random access to data on a database.

20 Claims, 8 Drawing Sheets

```
IMPERATIVE

FACTORIAL ( INT X ){

INT VALUE = 1;

FOR (INT I = X; I > 1; I--){
   VALUE = VALUE * I;
}

RETURN VALUE;

}

INT N = FACTORIAL (10);
                                    102
```

```
FUNCTIONAL

LET FACTORIAL ( INT X ){

IF (X <= 1) RETURN 1;
ELSE
RETURN X* FACTORIAL(X-1);

}

INT X = FACTORIAL(10);
                                    104
```

*FIG. 1A*

```
INT A = 2 + 3;           ⌐ 112

INT B = 2 + FACTORIAL(3) ⌐ 114
                         ⌐ 116
INT C = A + FACTORIAL (4)
```
110

```
Function var table = fn ( IMAGES ){
  return
        (map ( getProfile (t) {
                return
                        t.name
                        t.gender
                        (t.image ? t.file : "No Image")
        }, IMAGES)
}
```
*502*

```
Data

IMAGES

IMAGES[0]
        string name:  Al
        string gender: Male
        boolean image: Y
        data file: <al.jpg>

IMAGES[1]
        string name:  Peg
        string gender: Female
        boolean image: N
        data file: null
```
*504*

ASYNCHRONOUS COMPUTATION BATCHING

The present application relates generally to the technical field of web development technology and, in one specific example, to asynchronous computation batching.

BACKGROUND

Multiple factors, such as increasing broadband connectivity, the inconvenience associated with computer viruses and hardware redundancy, and the emergence of advertising supported software as a business model, have bolstered the migration of the functionality of locally stored software applications to network based web applications.

Web applications may require communications over a network with a server, (e.g., a web or database server), which introduces latency issues that affect performance, especially in comparison to locally hosted applications. Current web application implementations seek to minimize the effects of latency on application performance by defining when and how to query a server in an efficient manner. The operations defining when to query a server is often accomplished through customized software. The creation and maintenance of the customized software controlling queries can require significant developer resources.

BRIEF DESCRIPTION OF THE DRAWINGS

Some embodiments are illustrated by way of example and not limitation in the figures of the accompanying drawings in which.

DETAILED DESCRIPTION

Example methods and systems for supporting asynchronous computation batching are described. In the following description, for purposes of explanation, numerous specific details are set forth in order to provide a thorough understanding of example embodiments. It will be evident, however, to one skilled in the art that the present invention may be practiced without these specific details. As used herein, the term "or" may be construed in an inclusive and exclusive sense.

Web applications, such as applications presented via a browser and transmitted over a network, provide application users and application developers with certain advantages over locally installed applications. An application developer can design a web application to conform to internet standards to ensure cross-platform compatibility (e.g., Windows, Linux) and a consistent user experience across platforms. Web applications also allow an application developer to update and maintain an application without the need for distributing and installing updates on a user's computer. An application user can access the web application from any device that supports a web client, without needing to locally install the application.

The popularity of web applications and the maturation of web application technologies has resulted in a growing focus on areas such as software as a service (SaaS) and cloud computing. The demand for web applications and their related products has also resulted in increasingly complex web applications that require greater amounts of data and computational resources while simultaneously supporting a responsive and rich user experience mirroring the user experience provided by locally installed applications.

Complex web applications can be difficult to write as they depend on data and instructions received over a network from a server. Expensive round trips to a server, such as, but not limited to, a query from a client to a server for data and instructions and a response message from the server back to the client, or a similar set of queries between a web server and database server or a data requestor and a data provider, are affected by network latency that may frustrate a responsive user experience. In contrast, locally installed applications may access data from a local disk over a hardware bus with a lower latency.

Application developers can reduce the effects of network latency by defining the number and the nature of round trip server queries and by reducing the amount of data transferred. Defining when and how to make each round trip server query, including what data to query for, may improve performance. For example, in the loading of a webpage with text and images, an application can make a batch query for the text and the images, as opposed to requesting the text, waiting for a response and then transmitting a second query for the images only after receiving the text. However, the customized software defining when and how to make round trip server queries can be complex, often times more complex than the operations supporting the main functionality of the web application. In addition, changes to the functionality of the web application may result in changes to the customized software defining when to make a round trip server query, which may be highly nuanced and difficult to modify. Thus, the production and maintenance web applications currently may include involvement with customized software defining round trip server queries, which can often be time consuming and inefficient.

According to an example embodiment, a web technology may permit an application developer to design and write a web application assuming random access to data on a server and have the customized software controlling efficient round trip server queries be automatically generated. In one embodiment, efficient creation and maintenance of web applications is enabled by analyzing source code that possesses the property of referential transparency, such as a functional programming language or a side-effect free implementation of a program using an imperative language, to generate code that batches calls to the server in an asynchronous fashion exploiting the parallel nature of referentially transparent functions.

Functional programming languages may be Turing Complete languages whose syntax and inherent properties provide opportunities to optimize computation using parallelism. They emphasize the evaluation of expressions as opposed to the specific operations or actions to execute. Functional programming languages are derivatives of the lambda calculus, a system for defining functions, arguments and function applications. The lambda calculus defines functions that take an input. As an illustration, a function may be defined as $\lambda x:x$, where $\lambda$ denotes the function name, the variable after X denotes the input and the variable after the colon denotes the expression, here merely the identity function. In variations of the lambda calculus, functions themselves are first class values that may be passed as input to another function or be the return value of a function. Modern functional languages use shorthand techniques, such as currying, to enable multiple arguments, lists, and other data structures to increase ease of use but still maintain the essence of the lambda calculus as defining functions, arguments to functions and function applications.

A quality of functional programming languages, as inherited from the lambda calculus, is the lack of, or limited scope of, side-effects. The lack or limited scope of side-effects can also be accomplished through carefully written programs using an imperative language. A side-effect is the modification of a state, an impact on the outside world or an observable interaction with a calling function. In contrast to most programs implemented using imperative programming languages, such as C, which emphasizes change in the state of variables, e.g., $x=x+1$, variables in a functional programming language, or variables in programs implemented using imperative language that avoid side-effects, are immutable. Thus a value of a variable cannot be changed once defined nor can a function change the value of its arguments.

The lack of side-effects allows for referential transparency, the quality that a function called at any time with the same arguments always returns the same value. This is enabled in a side-effect free program because the arguments to the function cannot change value over time. Moreover, referential transparency implies that functions independent of each other, such as a function that does not rely on the output of another function, may be executed in any order or in parallel. In some situations, referential transparency may be preserved when limited side-effects are allowed. For example, a group of functions may create an output, such as a file or effect changes to a user interface, in which the functions themselves or the output are not affected by the order in which the functions are executed. Moreover, functions may be referentially transparent for the duration of their execution, yet still have side-effects. For example, functions A and B may not always output the same values as the value of their inputs may change, but within the limited duration required to execute both A and B, for any one execution of A and B, the inputs remain constant, thus they may share the quality of referential transparency for the limited duration and still benefit from parallelism.

An application developed to have no, or minimal, side-effects, such as an application written in a functional programming language or a program written using an imperative language in a side-effect free implementation, can be defined by functions that possess the quality of referential transparency and can evaluate at any point in time to determine all functions that could be executed in parallel and to aggregate the data requests of those parallelizable functions into a single request to the server. In contrast, an application developed in an imperative language with side-effects may make serial requests to the server because it may be unclear what data can be batch queried, or may need to contain customized software to define when and how to make data queries to optimize server queries. In an example embodiment, programs that permit limited side-effects, such as, but not limited to, outputting data, updating webpage content, or receiving user input, may still maintain referential transparency or may maintain it within the context of a limited duration or scope that preserves the ability to aggregate data required by parallelizable functions. In an example embodiment, the aggregation of required data from the server may include the data required by the parallelizable functions and the data required by dependent functions of the parallelizable functions, recursively, the aggregation continuing until data is required to determine what further data is needed, such as the data required to evaluate the expression of a branch operation, or until no further data is required, wherein after the aggregated data is then requested in a batch from a server and upon receipt of the requested data, analyzing the requested data to determine whether further data is needed, repeating the aggregation process if more data is needed, the process described herein known as asynchronous computation batching.

Data is necessary for a function at any one point in time when the data is known to be required for execution of the function and for which there is no question it will be used. For example, data that is accessed by a function that is executed only if a particular Boolean is true, when we do not know the value of the Boolean, is not necessary because the function may not be executed and the data may not be required for execution. However, if at any point in time we find the Boolean value is true, then the data is necessary because it will be used by the executed function. In an example embodiment, the asynchronous computation batching process may be able to analyze branch statements to evaluate whether data will be used regardless of the branch that is executed. For example, a program may branch into three possible paths of computation, but require the same data for all branches. Thus, the asynchronous computation batching algorithm may fetch the data shared among all three branches without first evaluating which branch to execute.

In an example embodiment, an application developer may write an application assuming random access to data stored on the server in a fashion preserving referential transparency between functions. A compiler may then analyze the referentially transparent source code and output interpreted code, such as, but not limited to, javascript, that batches server queries utilizing the process of asynchronous computation batching. Thus, the creation and maintenance of a web application does not require modification of customized software to ensure efficient round trip server queries.

Figure 1A:
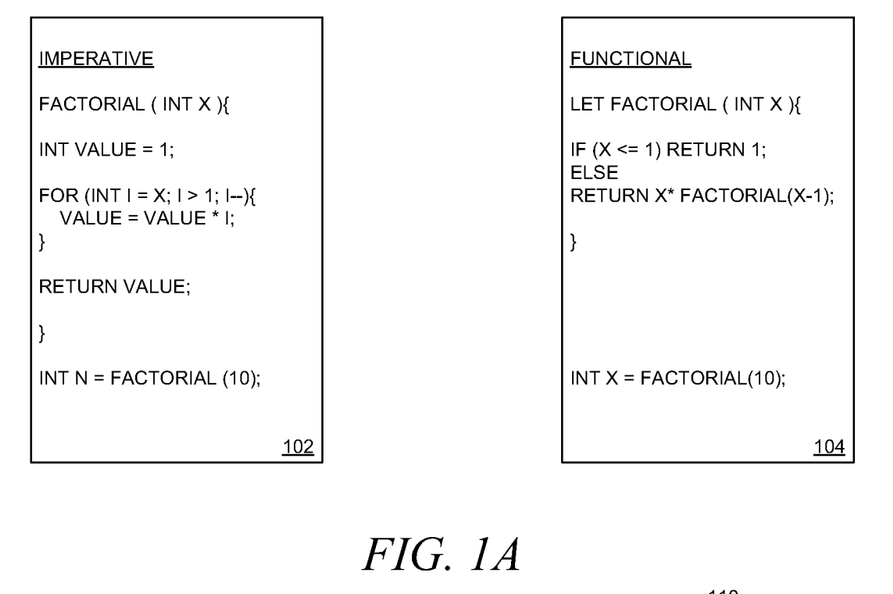
FIG. 1A is a diagram contrasting functional and imperative functions.

FIG. 1A is a diagram contrasting a functional side-effect free function and an imperative function with side-effects. Imperative languages and functions that allow for a change in state emphasize the operations and how to calculate in terms of actions and sequences. Functional languages and functions have no or limited side-effects, have immutable states, and emphasize the calculation of expressions. Imperative languages can be used to create programs with the qualities of functional languages, as referential transparency. Both example imperative code 102 with side-effects and example functional code 104 define and calculate the same operation: 10!. However, in the execution of the imperative function 102 the values of "INT I" and "INT VALUE" are changed with each iteration of the FOR loop. Moreover, the imperative function 102 could have accessed a global variable or changed the value of an input parameter, and thus it cannot guarantee referential transparency. The functional code 104 uses recursion and does not change the state of any variable. Thus, the functional code 104 would be referentially transparent with any other function.

Figure 1B:
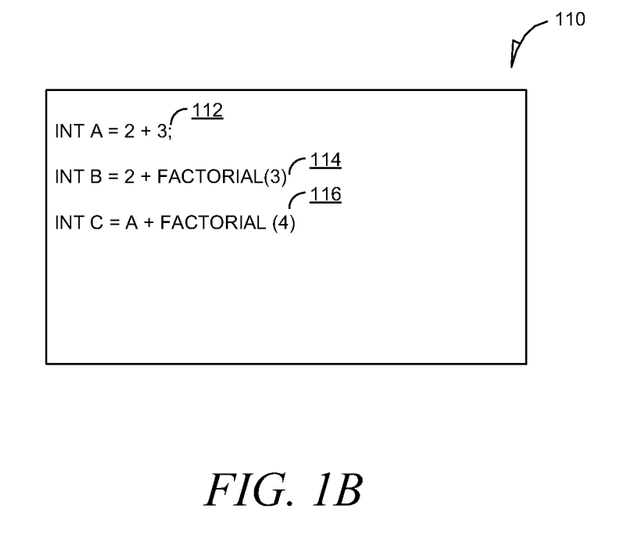
FIG. 1B is a diagram contrasting dependent and independent functions.

FIG. 1B is a diagram contrasting dependent and independent functions. An independent function is an expression that can be evaluated without requiring another variable to be evaluated first. Thus the expression evaluating INT A 112 is independent because it can be evaluated without requiring another variable to be evaluated. Similarly, the expression evaluating INT B 114 is independent even though it calls a function, because it does not depend on the value of another variable. Thus, the expressions 112 and 114 can be executed in any order or in parallel because they are independent. However, the expression evaluating INT C 116 is dependent because the expression defining INT A 112 must be evaluated before it can be evaluated. Thus, the expression evaluating INT C 116 is dependent upon the expression evaluating INT A 112. In an example embodiment, the expression evaluating INT A and INT B would be parallelizable and the expression evaluating INT C is dependent.

Figure 2:
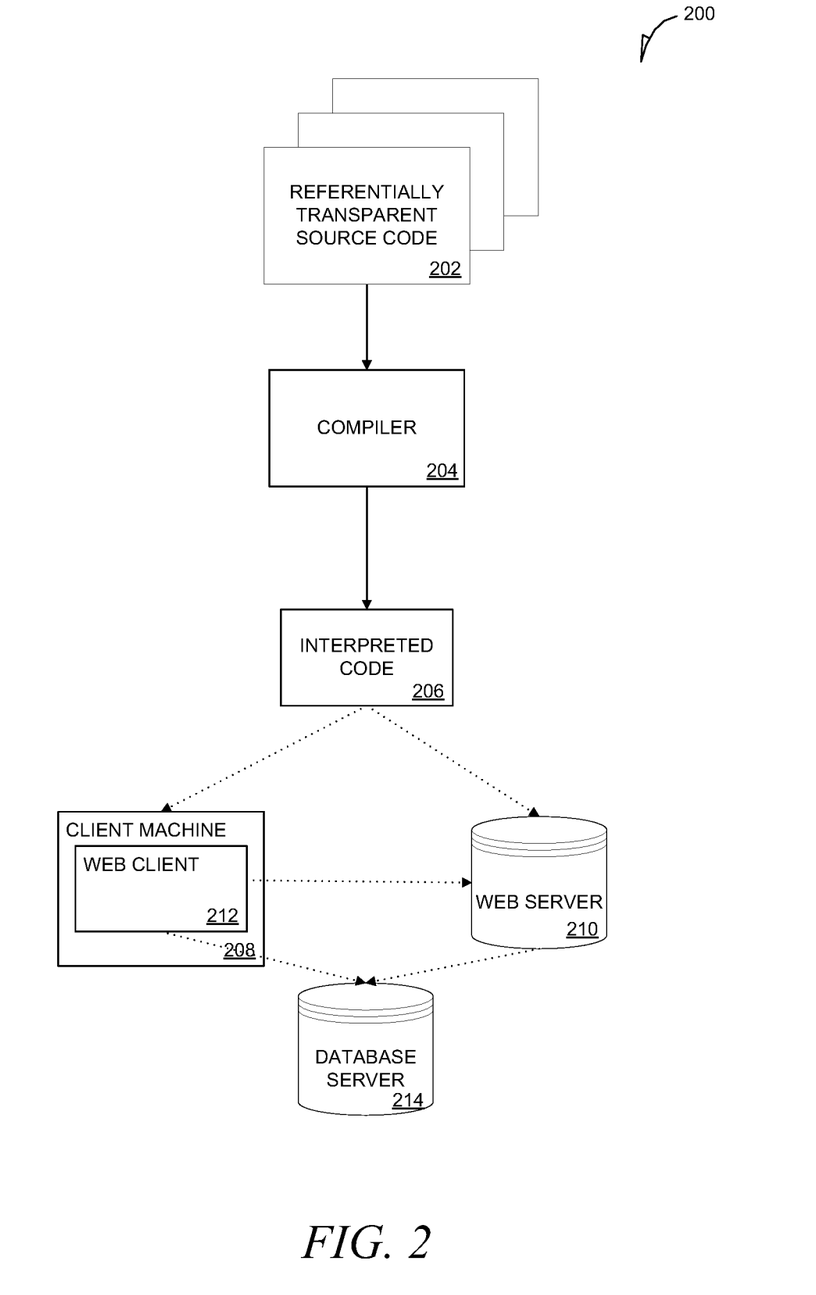
FIG. 2 is a block diagram of a system that disseminates functional source code to a web client and web server, according to an example embodiment.

FIG. 2 is a block diagram of a system 200 that distributes referentially transparent code and implements asynchronous computation batching, according to an example embodiment. An application developer writes source code 202, for example defining a web application, in a fashion that preserves referential transparency. In an example embodiment, the referentially transparent source code 202 is in a functional language or a side-effect free imperative language implementation. The source code 202 may be referentially transparent only for a limited duration or scope as to preserve the ability to execute functions in parallel. The source code 202 may be written to assume random access to data stored on a web server 210 or a database server 214. The referentially transparent source code 202 is provided to a compiler 204 that translates the source code 202 to interpreted code 206, such as, but not limited to, javascript or other functional or imperative languages that may be run on a web client 212, such as, but not limited to, MICROSOFT INTERNET EXPLORER®, a web server 210 or any machine or application that may request data from a server. In an example embodiment, the compiler 204 provides javascript code that can be run on the web client 212 of a client machine 208 or runs on a web server 210. The interpreted code 206 implements the processes of determining parallelizable functions and batching their required data requests. In an example embodiment, the interpreted code 206 also batches the data required by dependent functions of the parallelizable independent functions until more data is required to determine what further data is needed or no further data is required, recursively. The interpreted code 206 may implement an asynchronous computation batching process. The web client 212 on the client machine 208 may execute the interpreted code 206 to request data from the web server 210 or the database server 214. The interpreted code 206 may also be executed on a web server 210 to request data from a database server 214 and may instantiate a web application.

Figure 3:
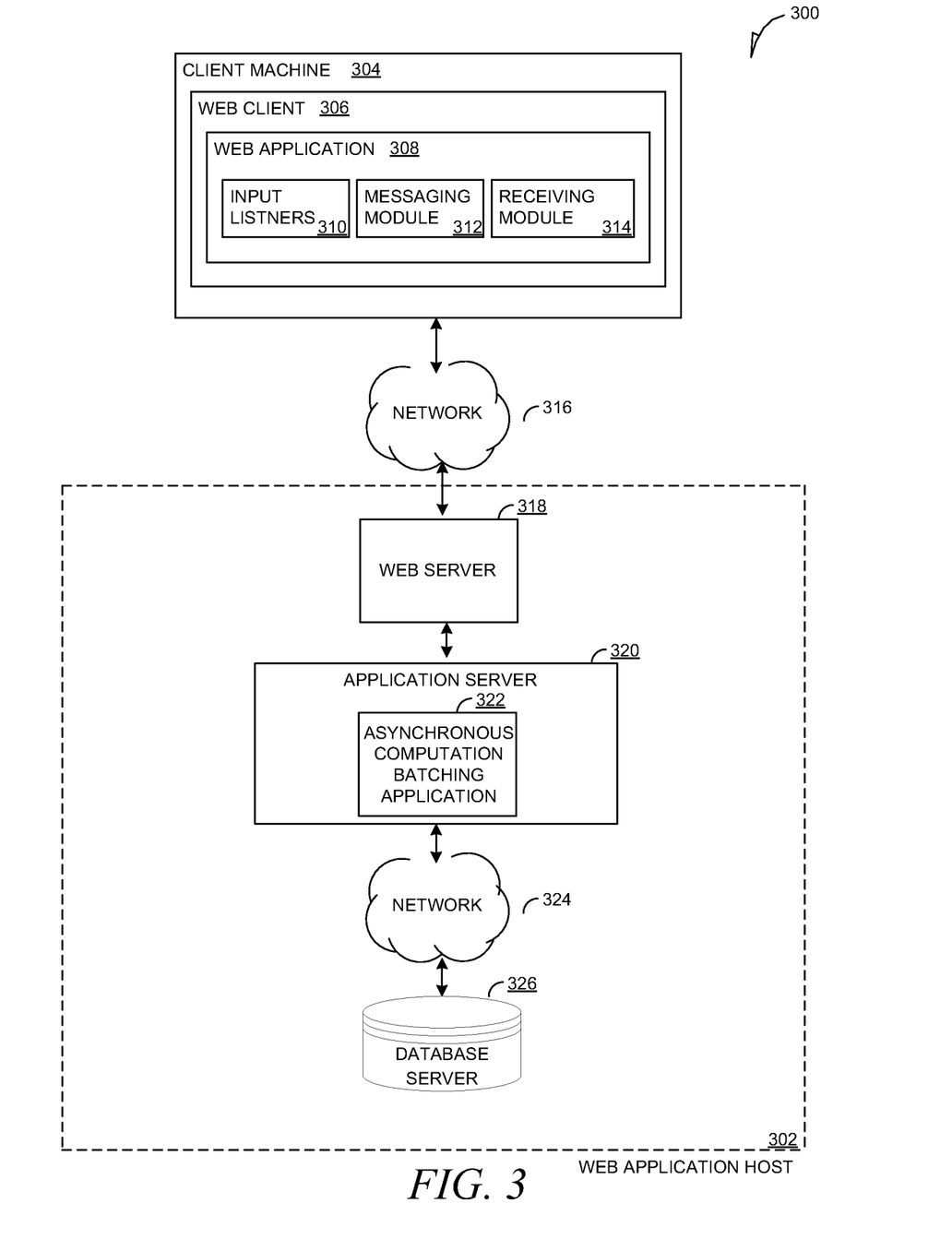
FIG. 3 is a block diagram of a system for supporting asynchronous computation batching, according to an example embodiment.

FIG. 3 is a block diagram of a system 300 for supporting asynchronous computation batching, according to an example embodiment. The system 300 for supporting asynchronous computation batching contains a web application host 302. The web application host 302 stores and provides the data and instructions required to operate a web application 308. The web application 308 may be an application accessed through a browser over a network or an application on a device, such as a mobile application on a cell phone. The web application 308 is accessed from a web client 306, such as, but not limited to, MICROSOFT INTERNET EXPLORER®, SAFARI®, OPERA® or a web browser or mobile application, that runs on a client machine 304, such as, but not limited to, a personal computer, cell phone, mobile device or machine capable of launching a web client 306.

The web application 308 consists of various modules, including, but not limited to, an input listener 310, a messaging module 312, and a receiving module 314. An input listener 310 of the web application 308 waits for pre-defined user input or trigger events that cause the web application 308 to request data. In an example embodiment, an input listener 310 may respond to mouse clicks, keyboard input or the occurrence of trigger events that cause the web application 308 to request data. In a further embodiment, a trigger event may be notification from a server that a stored data value has changed. A trigger event may also be a periodic event, such as a trigger occurring every hour. The input listener 310 then communicates with a messaging module 312 to transmit a data query over a network 316, such as a communications network as embodied by the internet or an intranet, to the web application host 302. Data returned by the web application host 302 in response to the data query sent by the messaging module 312 is captured by the receiving module 314. The receiving module 314 processes the data from the web application host 302 and may update the web application 308 accordingly. In an example embodiment, modules of the web application 308 may implement the asynchronous computation batching process.

The data query sent by the messaging module 312 may be received by a web server 318 of the web application host 302. The web server 318 may host an application server 320, such as, but not limited to, an APACHE APPLICATION SERVER®, which runs various applications, including an asynchronous computation batching application 322. The asynchronous computation batching application 322 analyzes and prepares the data for the web application 308. The asynchronous computation batching application 322 queries a database server 326 that stores the requested data. In an example embodiment, the asynchronous computation batching application 322 analyzes the data collected by the input listener 310 and implements an asynchronous computation batching process to efficiently query data from the database server 326 over a network 324. In an example embodiment, the web application 308 implements an asynchronous computation batching process to efficiently query data from the web server 318 utilizing the asynchronous computation batching application 322.

Figure 4:
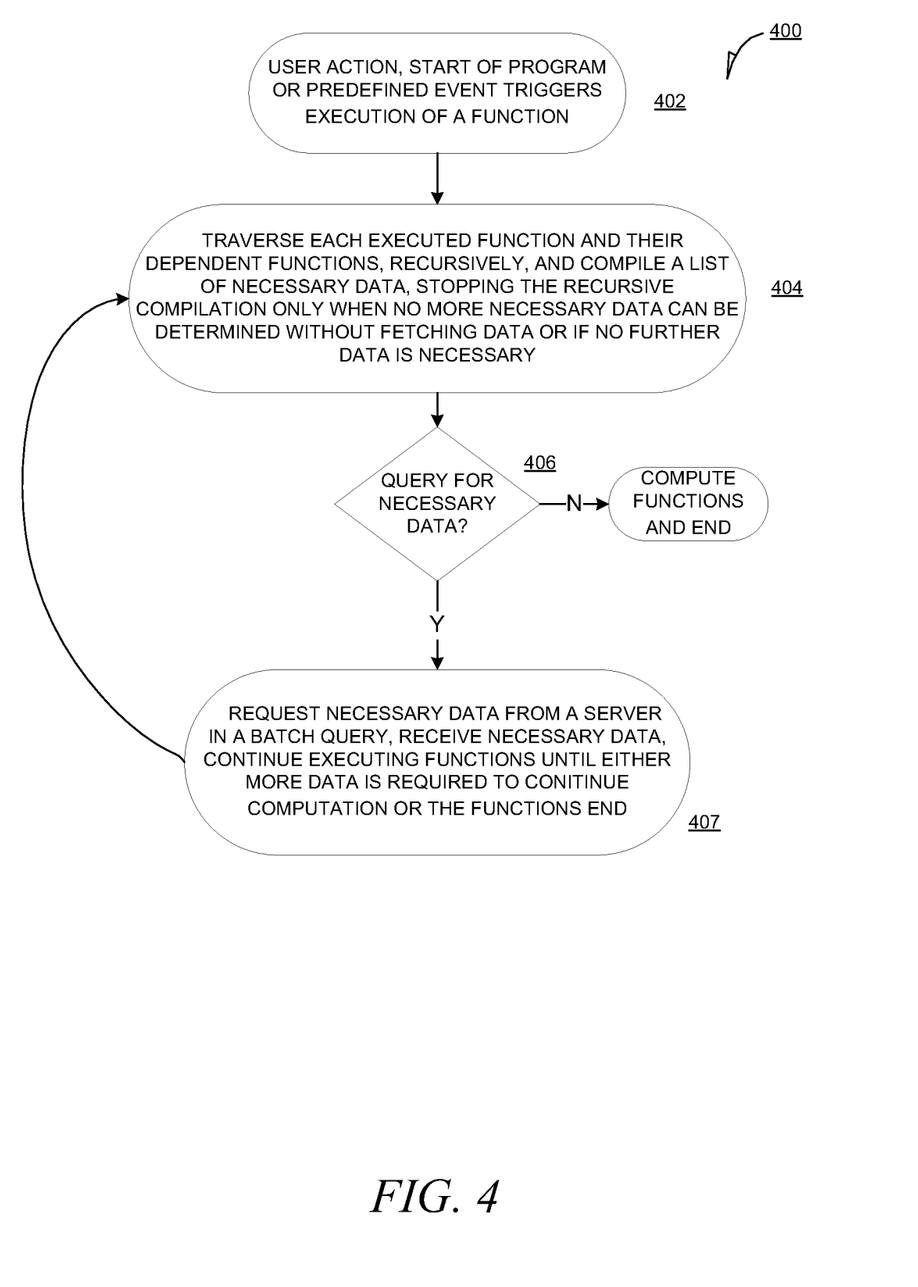
FIG. 4 is a flow chart illustrating a process of aggregating requested data, according to an example embodiment.

FIG. 4 is a flow chart illustrating the asynchronous computation batching process 400, according to an example embodiment. In an example embodiment, the batching process may be performed by the asynchronous computation batching application 322 hosted on the application server 320. Of course, the batching process 400 may similarly be performed by a client application executing on a client machine.

At operation 402, a user action, start of a program, or a predefined event triggers the execution of a function. In an example embodiment, a trigger event may be user input or the advancement of time to a certain point. Next, at operation 404, each function that could be executed is analyzed for data that it will request and which can be accessed from a server. The requested data is then compiled into a list of requested data. Data requested by a function is added to the compiled list until either no more necessary data can be determined without fetching further data, such as with a branch statement, or until no further data is required. This process is applied to dependent functions of the triggered functions, recursively. Thus, all data that is known to be necessary is collected in a batch. In an example embodiment, the batch query may include data that is used by all execution paths of a branch, even though the data necessary to evaluate the branch statement is unavailable.

At operation 406, the batching process 400 determines whether any necessary data was requested by the function. If no data is necessary, then the asynchronous computation batching process 400 completes execution of the functions and terminates. If necessary data is requested by the functions, then at operation 407 the necessary data is requested from a server in a single batch query. Continuing with operation 407, the requested necessary data is returned from a server and computation continues given the requested data. Functions are computed until either more data is required to continue computation, such as with a branch statement or the function utilizes data that was not previously fetched, or the function ends. The batching process 400 then returns to operation 404.

Upon returning to operation 404, if no further data is necessary, such as if the executed function ends, then the asynchronous computation batching process 400 ends at operation 406 since no further data is required. If more data is necessary, then at operation 404 executing functions are analyzed for the necessary data for their computation, as well as dependent functions, recursively. In an example embodiment, a cache of previous received necessary data may remove from a batch query requests for necessary data that already exist in the cache. The process 400 of analyzing for necessary data, making batch queries and furthering computation repeats until either no further data is used by the functions or the functions end.

Figure 5A:
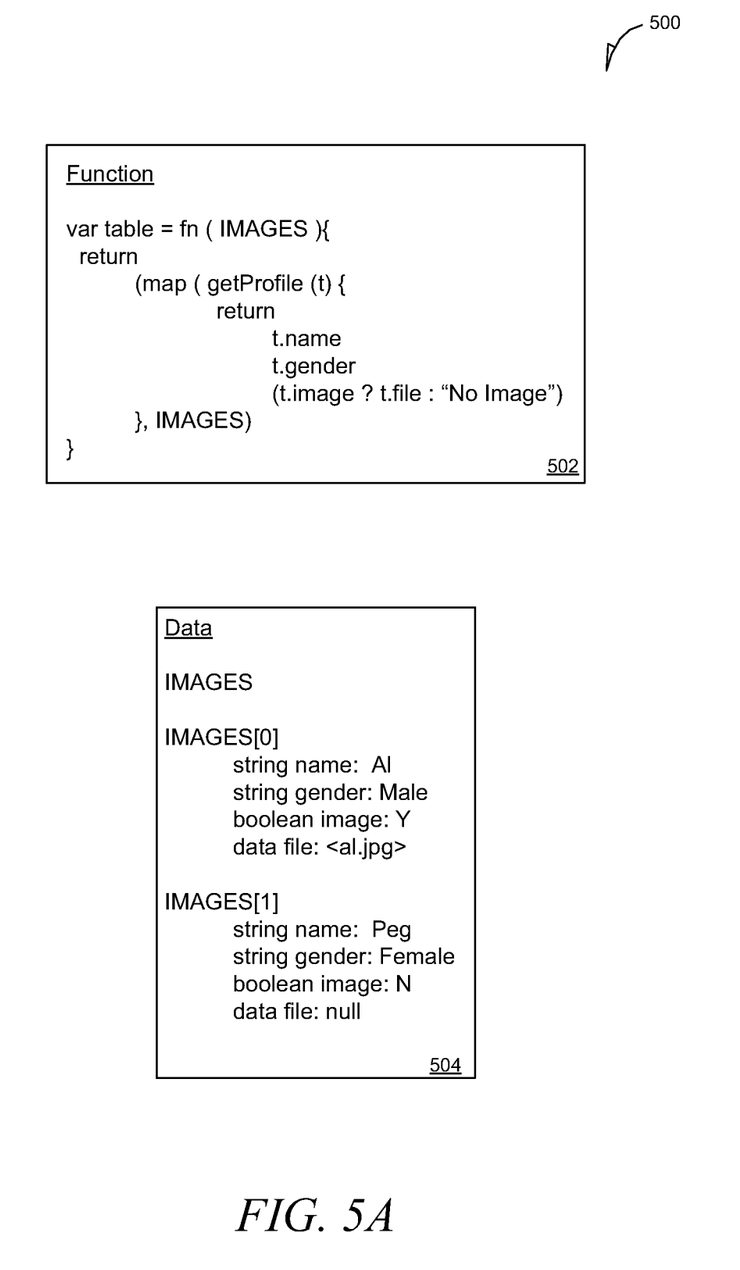
FIG. 5A is a function and a data array, according to an example embodiment.
Figure 5B:
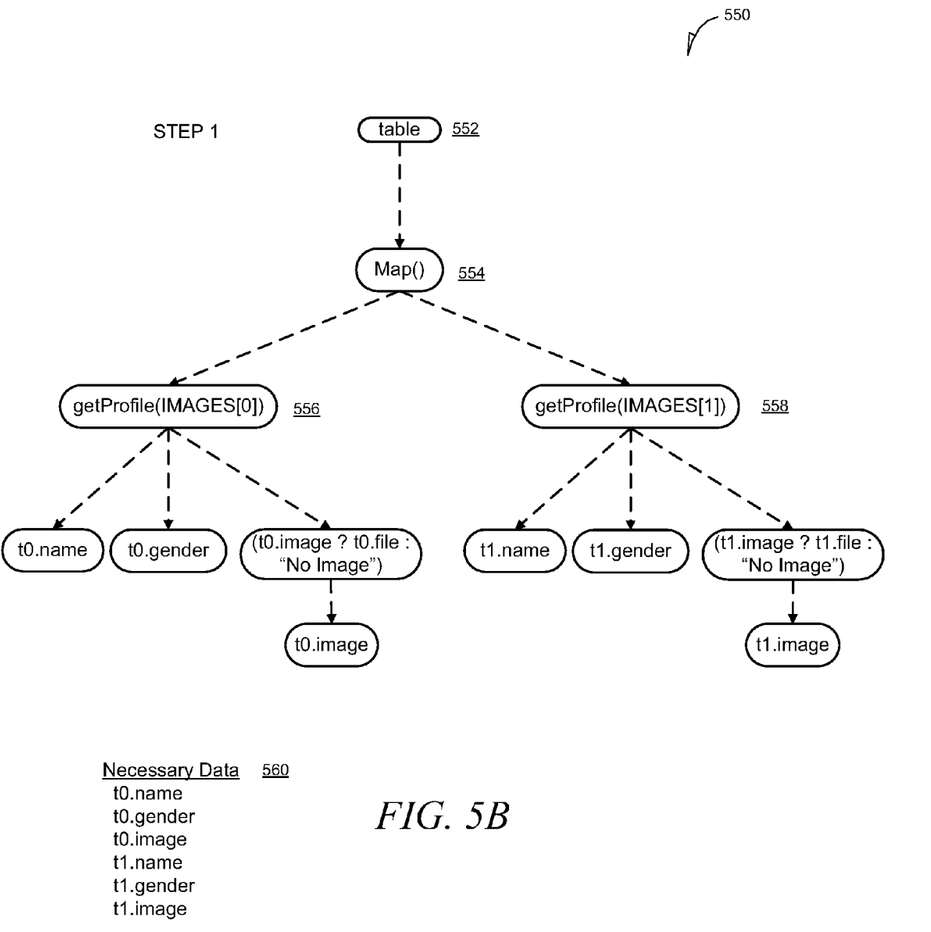
FIG. 5B is an execution tree illustrating a first operation of an asynchronous computation batching algorithm, according to an example embodiment.

FIG. 5A is a block diagram showing a function and a data array 500, according to an example embodiment. The function 502 defines the variable TABLE. The function 502 outputs the results of the function getProfile applied over the data array IMAGES, which will list the name, gender and image, if one exists, of the profiles stored within the array IMAGES. The data 504 defines the IMAGES array, specifically containing two elements, the first IMAGES[0] with an image while the second IMAGES[1] does not does not have an image. FIG. 5B is a hierarchical data diagram showing an execution tree 550 representing an example application of the asynchronous computation batching process 400 to the execution of the function 502 with data 504 as input. The execution of the function 502 defines the table variable 552 which becomes the root of the tree. Next, map( ) 554 calls the getProfile function twice, once for each element of the IMAGES array 556, 558. The executed program executes two functions, getProfile(IMAGES[0]) 556 and getProfile(IMAGES[1]) 558. An asynchronous computation batching algorithm (e.g., as an instantiation of the batching process 400) evaluates both executed functions. Because getProfile(IMAGES[0]) 556 and getProfile(IMAGES[1]) 558 are independent of each and are referentially transparent, they can be executed in any order or in parallel. Thus the asynchronous computation batching algorithm collects the necessary data from both functions until no further data is requested or until more data is required to determine if further data is necessary, into a list of necessary data 560. In this example, the function getProfile simply outputs the strings of name and gender, so these values for IMAGES[0] and IMAGES[1] are added to the list of necessary data 560. However, a sub-function of the getProfile function is a conditional, which outputs a file only if the Boolean value of the variable "image" is true, otherwise it outputs the text "No Image." Because the Boolean value of IMAGES[0].image and IMAGES[1].image are required in order to determine if further data is to be requested, both items are added to the list of necessary data 560. No further data is known to be necessary, so the asynchronous computation batching algorithm sends a batched request for the data in the necessary data list 560 to the server, namely the values of name, gender and image for the elements IMAGES[0] and IMAGES[1]. The data of IMAGES[0].file is not fetched even because it is unclear whether it will be requested due to the branch, and hence is not necessary.

Figure 5C:
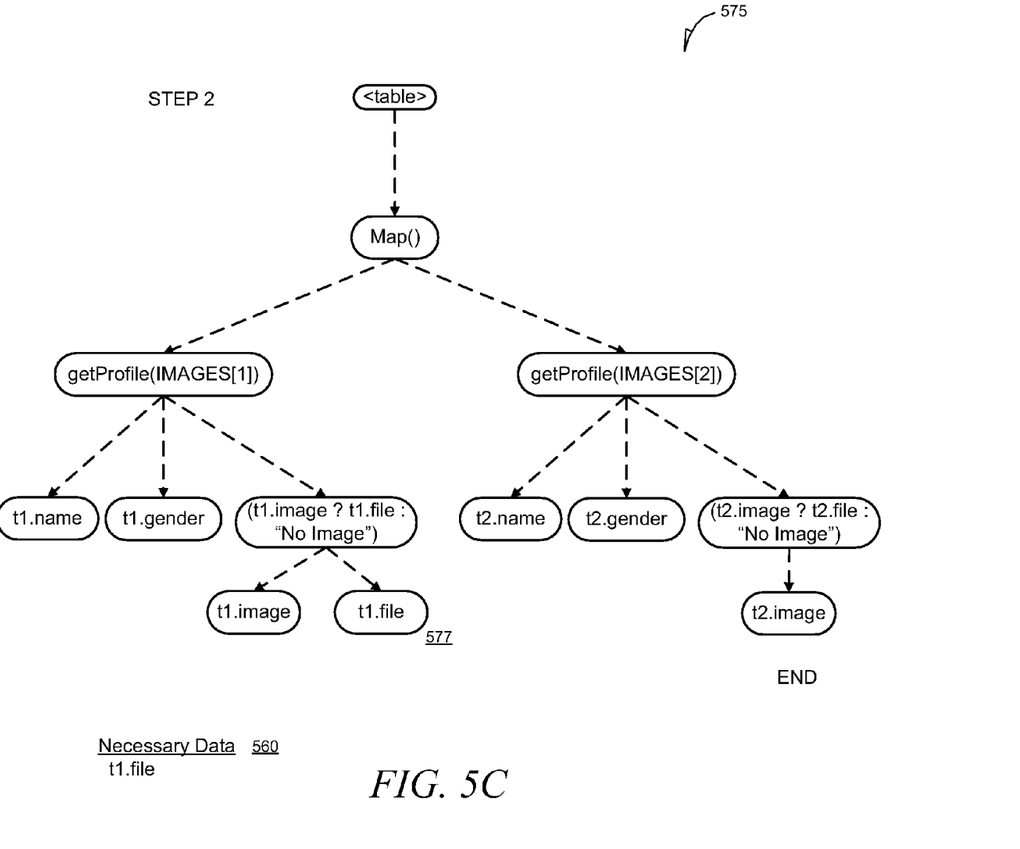
FIG. 5C is an execution tree diagram illustrating a second operation of an asynchronous computation batching algorithm, according to an example embodiment.

FIG. 5C is a hierarchical data diagram showing an execution tree diagram 575 representing a second operation of an asynchronous computation batching algorithm that instantiates the batching process 400, according to an example embodiment. After the batched data request of necessary data 560 is sent to the server and the requested data returned, the asynchronous computation batching process evaluates whether further computation is required in order to determine if more data is required. In the evaluation of both getProfile (IMAGES[0]) and getProfile(IMAGES[1]) the conditional statement needs to be evaluated in order to determine if more data is required. In the evaluation of getProfile(IMAGES[0]), the value of IMAGES[0].image is true, and thus further data in terms of IMAGES[0].file 577 is necessary for this function. However, in the evaluation of getProfile(IMAGES[1]), we see that the value of IMAGES[1].image is false, so no further data is required for this function. Hence, IMAGES[0].file is added to the list of necessary data 560 to request from the server and requested during the next batch request to the server. After the image 577 is retrieved no further data is required by the function and the asynchronous computation batching algorithm terminates.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
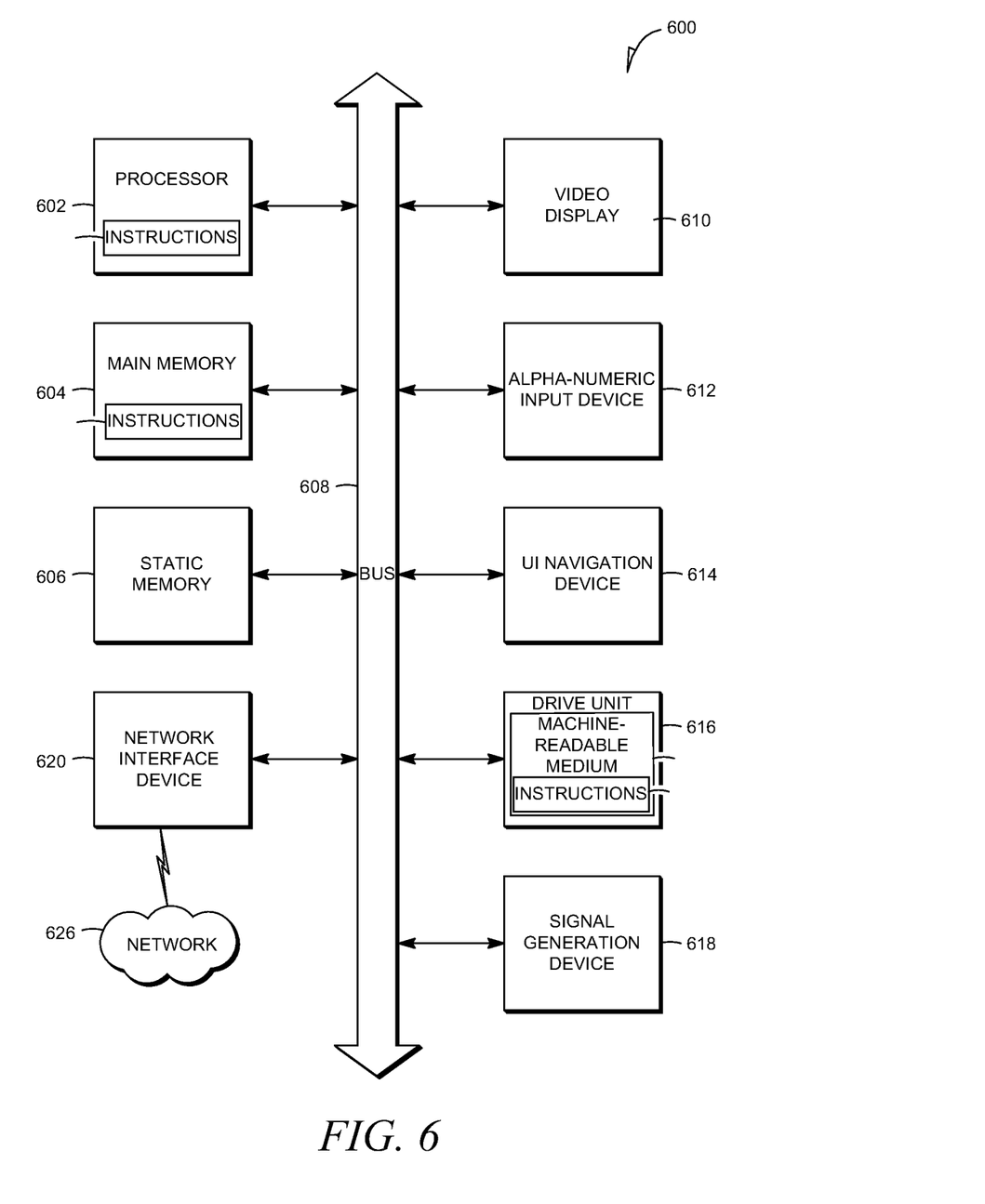
FIG. 6 is a block diagram of machine in the example form of a computer system within which a set instructions, for causing the machine to perform any one or more of the methodologies discussed herein, may be executed.

FIG. 6 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or used by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:

receiving an input in a web application to trigger execution of one or more functions;

in response to receiving the input, traversing each executed function and its dependent functions analysing the functions and the dependent functions to identify at least two independent referentially transparent functions that are executable with necessary data, and that have not yet executed; and analysing the at least two identified independent referentially transparent functions to determine the necessary data that will be used by the identified at least two independent referentially transparent functions in the course of their execution;

recursively continuing the acts of analysing to identify and analysing to determine at least until the act of analysing to determine determines that either, no further necessary data for the at least two identified referentially transparent functions can be determined without fetching the data, or no further data is necessary for the at least two identified referentially transparent functions;

in response to determining that no more necessary data can be determined for the at least two identified referentially transparent functions without fetching or that no more data is necessary for the at least two identified referentially transparent functions, issuing an asynchronous computation batch query to a database server for the determined necessary data so as to aggregate the necessary data of the independent referentially transparent functions;

wherein the necessary data comprises data used in all branches of a branch statement when the branch statement is not evaluated;

receiving the necessary data; and executing the at least two independent referentially transparent functions in parallel using the received necessary data.

2. The method of claim 1, further comprising recursively applying the operations of analyzing, issuing, receiving and executing to dependent functions of the independent referentially transparent functions, recursively, treating the dependent functions as independent referentially transparent functions.

3. The method of claim 1, wherein the independent referentially transparent functions have side-effects and maintain referential transparency for a duration sufficient to parallelize execution.

4. The method of claim 1, wherein the independent referentially transparent functions have side-effects that do not affect parallel execution of the independent referentially transparent functions.

5. The method of claim 1, further comprising a cache containing previously received necessary data, the method including removing the previously received necessary data from the batch query based on the previously received necessary data contained in the cache.

6. The method of claim 1, further including:

in response to receiving the necessary data, analysing the at least two identified independent referentially transparent functions to determine whether additional necessary data that will be used by the identified independent referentially transparent functions in the course of their execution;

in response to determining that additional necessary data will be used, issuing a query to the server for the additional necessary data; and receiving the additional necessary data.

7. A system comprising:

a computer system that includes a web application to receive an input to trigger execution of one or more functions and in response to receiving the input, traversing each executed function and its dependent functions, to analyze the functions and the dependent functions to identify at least two independent referentially transparent functions that are executable with necessary data, and that have not yet executed, and analysing the at least two identified independent referentially transparent functions to determine the necessary data that will be used by the identified at least two independent referentially transparent functions in the course of their execution, recursively continuing the acts of analysing to identify and analysing to determine at least until the act of analysing to determine determines that either, no further necessary data for the at least two identified referentially transparent functions can be determined without fetching the data, or no further data is necessary for the at least two identified referentially transparent functions and that can be obtained from a database server and to aggregate the necessary data of the independent referentially transparent functions;

a messaging module included in the computer system to issue an asynchronous computation batch query for the necessary data, in response to determining the necessary data; and wherein the necessary data comprises data used in all branches of a branch statement when the branch statement is not evaluated;

a receiving module included in the computer system to receive the necessary data, the web application to execute the independent referentially transparent functions in parallel using the received necessary data, and to iterate calls to the web application, messaging module, and receiving module, as long as the referentially transparent functions require the further data to execute.

8. A system of claim 7, wherein the web application, messaging module and receiving module are recursively applied to dependent functions of the independent referentially transparent functions, treating the dependent functions as independent referentially transparent functions.

9. The system of claim 7, wherein the web application analyzes independent referentially transparent functions that have side-effects and maintain referential transparency for a duration sufficient to parallelize execution.

10. The system of claim 7, wherein the web application analyzes independent referentially transparent functions that have side-effects that do not affect the ability to parallelize execution of the independent referentially transparent functions.

11. The system of claim 7, wherein the web application analyzes independent referentially transparent functions that have side-effects and can maintain referential transparency for a duration sufficient to complete execution.

12. The system of claim 7, wherein the web application further contains a cache containing previously received necessary data, the web application to remove the previously received necessary data from the batch query based on the previously received necessary data contained in the cache.

13. A method comprising:

writing a web application in referentially transparent source code that assumes random access to data on a database;

compiling the referentially transparent source code into imperative code that implements the web application and requests data, the implementation including:

receiving an input to trigger execution of one or more functions;

in response to receiving the input, traversing each executed function and its dependent functions, and analyzing the functions and the dependent functions to identify at least two independent referentially transparent functions that are executable with necessary data and that have not yet executed;

analysing the at least two identified independent referentially transparent functions to determine the necessary data that will be used by the identified at least two independent referentially transparent functions in the course of their execution; at least until the act of analysing to determine determines that either, no further necessary data for the at least two identified referentially transparent functions can be determined without fetching the data, or no further data is necessary for the at least two identified referentially transparent functions;

in response to determining that no more necessary data can be determined for the at least two identified referentially transparent functions without fetching or that not more data is necessary for the at least two identified referentially transparent functions, issuing an asynchronous computation batch query to a database server for the determined necessary data so as to aggregate the necessary data of the independent referentially transparent functions;

wherein the necessary data comprises data used in all branches of a branch statement when the branch statement is not evaluated;

receiving the necessary data; and executing the at least two independent referentially transparent functions in parallel using the received necessary data.

14. A non-transitory machine-readable medium comprising instructions, which when implemented by one or more processors perform the operations comprising:

receiving an input in a web application to trigger execution of one or more functions;

in response to receiving the input, traversing each executed function and its dependent functions;

analysing the functions and the dependent functions to identify at least two independent referentially transparent functions that are executable with necessary data, and that have not yet executed; and analysing the at least two identified independent referentially transparent functions to determine the necessary data that will be used by the identified at least two independent referentially transparent functions in the course of their execution;

recursively continuing the acts of analysing to identify and analysing to determine at least until the act of analysing to determine determines that either, no further necessary data for the at least two identified referentially transparent functions can be determined without fetching the data, or no further data is necessary for the at least two identified referentially transparent functions;

in response to determining that no more necessary data can be determined for the at least two identified referentially transparent functions without fetching or that not more data is necessary for the at least two identified referentially transparent functions, issuing an asynchronous computation batch query to a database server for the determined necessary data so as to aggregate the necessary data of the independent referentially transparent functions;

wherein the necessary data comprises data used in all branches of a branch statement when the branch statement is not evaluated;

receiving the necessary data; and executing the at least two independent referentially transparent functions in parallel using the received necessary data.

15. A non-transitory machine-readable medium as in claim 14, further comprising the operation of recursively applying the operations of analyzing, issuing, receiving and executing to dependent functions of the independent referentially transparent functions, recursively, treating the dependent functions as independent referentially transparent functions.

16. A non-transitory machine-readable medium as in claim 14, wherein the independent referentially transparent functions have side-effects and maintain referential transparency for a duration sufficient to parallelize execution.

17. A non-transitory machine-readable medium as in claim 14, herein the independent referentially transparent functions have side-effects that do not affect the parallel execution of the independent referentially transparent functions.

18. A non-transitory machine-readable medium as in claim 14, further comprising a cache containing previously received necessary data which removes data from the batch query if it is contained in the cache.

19. A method comprising:

receiving an input in a web application to trigger execution of one or more functions;

in response to receiving the input, executing multiple independent referentially transparent functions in parallel, wherein each function is executed in parallel until more data is required to continue execution or the function ends;

traversing each of the multiple functions to determine each of functions executing in parallel that require more data to continue execution;

in response to determining that each function executing in parallel that has not ended requires more data, issuing an asynchronous computation batch query to a database server for the determined necessary data required to continue execution of each function executing in parallel that has not ended that requires more data so as to aggregate the necessary data of the independent referentially transparent functions;

wherein the necessary data comprises data used in all branches of a branch statement when the branch statement is not evaluated;

receiving the necessary data;

continuing execution of the independent referentially transparent functions in parallel using the received necessary data; and iterating the operations of executing, traversing, determining, issuing, receiving and executing, as long as one or more of the functions that require more data to continue execution.

20. The method of claim 6, wherein executing the at least two independent referentially transparent functions includes executing using the received additional necessary data.

* * * * *